Sept. 17, 1929.  W. A. SCHMITTGEN  1,728,218
MOLDED KNOB
Filed Dec. 17, 1927
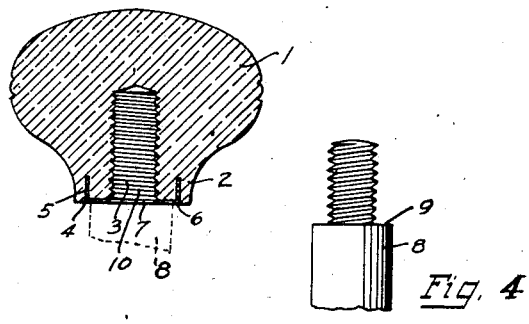
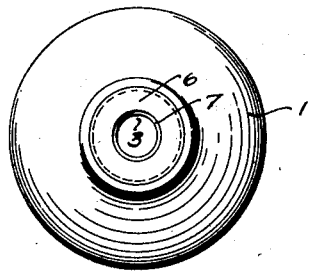
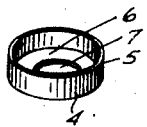
Inventor:
William A. Schmittgen
by Frank M. Slough
his attorney.

Patented Sept. 17, 1929

1,728,218

UNITED STATES PATENT OFFICE

WILLIAM A. SCHMITTGEN, OF ELYRIA, OHIO, ASSIGNOR TO THE GENERAL INDUSTRIES COMPANY, OF ELYRIA, OHIO, A CORPORATION OF OHIO

MOLDED KNOB

Application filed December 17, 1927. Serial No. 240,710.

My invention relates to molded knobs and relates particularly to knobs employed as ball handles for automobile gear shift levers, molded of phenolic condensate material.

Heretofore, so far as I am aware, it has been necessary in the matter of gear shift lever balls, having a threaded recess, to receive the threaded end of a gear shift lever to provide a metallic insert molded into the body of the ball, the insert itself providing the recess for threading on to the end of the gear shift lever, since otherwise the bakelite material engaging with the shoulder of the gear shift lever adjacent its threaded end will split away, and this action is such as to soon render the ball unfit for service and replacement is required.

An object of my invention, therefore, is to provide a gear shift lever ball capable of having the internal walls of the gear shift lever recess in the phenolic condensate molded material of the ball itself threaded for engagement with the reduced end of the gear shift lever and to provide means preventing the splitting away of the ball material at the mouth of the recess.

Another object of my invention is to accomplish the aforesaid object in a construction less expensive than the prior constructions involving the use of a molded internally threaded insert for the ball and which inserts are expensive besides occasionally coming loose within the ball.

Other objects of my invention and the invention itself will become apparent by reference to the following description of an embodiment of my invention and in which description reference will be had to the accompanying drawings.

Referring to the drawings:

Fig. 1 shows in longitudinal medial section a ball made practically entirely of phenolic condensation material embodying my invention;

Fig. 2 is a bottom plan view of the ball of Fig. 1;

Fig. 3 is a perspective view of a metallic insert, provided for the ball, whose function will be hereinafter set forth;

Fig. 4 is a view in elevation of an end of the gear shift lever, the remaining portion thereof being indicated as broken away.

Referring now to all of the figures of drawings in which like parts are designated by like reference characters, at 1 I show a body for the molded ball herein illustrated as being of a substantially squat pear shape with a broad upper portion and gradually reduced neck or base portion shown at 2. An axial internally threaded recess 3 is provided within the body of the ball and a metallic insert 4, preferably made of steel, has its lateral walls 5 extending within the phenolic condensation material of the ball, the material of the ball being flowed around such lateral walls and within the cup shape insert 4 during the process of molding the ball under considerable heat and great pressure.

The end wall 6 of the insert is perforated at 7, the perforation being in axial alignment with the threaded recess 3 of the ball and of a size at least as large as the greatest transverse dimension of the recess and preferably somewhat larger in diameter than the mouth of the recess, as shown.

I find that a steel insert such as that shown may be molded as illustrated in the bakelite material and under the conditions attending the practical use of the ball in service on a gear shift lever such as that illustrated at 8, the shank of which is indicated by dotted lines at 8, Fig. 1. The insert will remain in place and so distribute the end thrust inserted by the shoulders 9 of the gear shift lever upon the bottom portions of the base of the ball, and the compressive stresses exerted on the lowermost threads such as those shown at 10, Fig. 1, within the lateral walls of the cup 5, that the lowermost threads 10 and the phenolic condensation material of the ball within the cup insert generally, will be so supported that it will not break or be submitted to undue compressive stresses. I find that the provision of the lateral walls 5 is important since otherwise were a metallic washer merely placed at the bottom of the ball, the breaking away of the material of the bakelite ball is had, just as is the case where no such washer or disk is employed.

Having thus described my invention as a specific embodiment, I am aware that numerous and extensive departures may be made from the embodiment herein illustrated and described but without departing from the spirit of my invention.

I claim:

1. A handle ball adapted for application to the reduced threaded ends of gear shift levers, comprising an axial internally threaded recess extending from a base end of the ball, of an upright cup having lateral walls projected into the body of the material of the ball, said ball being molded under the influence of considerable heat and great pressure, of phenolic condensation material disposed about the lateral walls of said cup and with portions of the ball extending within the cup and supported by its end wall, the end wall of the cup being perforated to receive the reduced threaded end of a gear shift lever and having its end wall of such a diameter at least as great as that of the shoulder of the gear shift lever engageable with the base of its threaded end.

2. A handle knob comprising a body of phenolic condensation molded material, a metallic cup, said body having an axial internally threaded recess extending from the base end of the cup, said cup having its lateral walls projected into the body of the material of the ball, the body material being disposed in intimate molded contact with the inner and outer lateral wall surfaces of the cup, the end wall of the cup being centrally perforated to receive the reduced threaded end of a handle rod projected therethrough into the recess and making threaded engagement with the walls thereof.

3. A handle ball adapted for application to the reduced ends of rods, levers or the like, comprising a body of molded plastic composition material, having a reduced base portion, a metallic facing element for the end surface of the base, an annulus formed as an integral flange of the facing element, embedded by molding within the ball body, said ball so formed having an axial recess of less diameter than the annulus, extending through the facing and into the body of the ball, said recess having its lateral walls formed so as to engage the end of the rod or lever to secure it to the ball.

In testimony whereof I hereunto affix my signature this 15th day of December, 1927.

WILLIAM A. SCHMITTGEN.